(12) United States Patent
Morgan

(10) Patent No.: US 8,096,518 B1
(45) Date of Patent: Jan. 17, 2012

(54) TRUSS MOUNTED SUPPORT SYSTEM

(76) Inventor: Robert Elliott Morgan, Cullman, AL (US)

( * ) Notice: Subject to any disclaimer, the term of this patent is extended or adjusted under 35 U.S.C. 154(b) by 538 days.

(21) Appl. No.: 12/262,148

(22) Filed: Oct. 30, 2008

Related U.S. Application Data

(60) Provisional application No. 60/983,851, filed on Oct. 30, 2007.

(51) Int. Cl.
*B42F 13/00* (2006.01)
(52) U.S. Cl. .......................................... 248/339; 248/58
(58) Field of Classification Search .................. 248/317, 248/339, 304, 301, 58, 62, 215; 52/653.1, 52/693
See application file for complete search history.

(56) References Cited

U.S. PATENT DOCUMENTS

| | | | | |
|---|---|---|---|---|
| 4,973,021 A * | 11/1990 | Schuite | | 248/495 |
| 6,224,025 B1 * | 5/2001 | Alvarez | | 248/58 |
| 6,557,807 B1 * | 5/2003 | Belanger | | 248/215 |
| 7,641,356 B2 * | 1/2010 | Pieroth | | 362/130 |
| 2009/0008514 A1 * | 1/2009 | Panasik et al. | | 248/62 |
| 2010/0230550 A1 * | 9/2010 | Powers, III | | 248/58 |

* cited by examiner

*Primary Examiner* — Ramon Ramirez
(74) *Attorney, Agent, or Firm* — Erickson, Kernell, Derusseau & Kleypas, LLC

(57) ABSTRACT

A hanger support system that provides for attachment and suspension of materials from an elongated support structure such as an angle iron truss. The system includes a hanger support having a main body with means for attaching items to the hanger support, and an elongated tongue projecting upward from the main body to form a hook for hanging the hanger support upon the support structure. The hanger support further includes gussets projecting upward from the main body to engage the tongue and various bores in the main body for accepting threaded rod, or the shanks of bolts, to attach items to be suspended from the support structure.

17 Claims, 15 Drawing Sheets

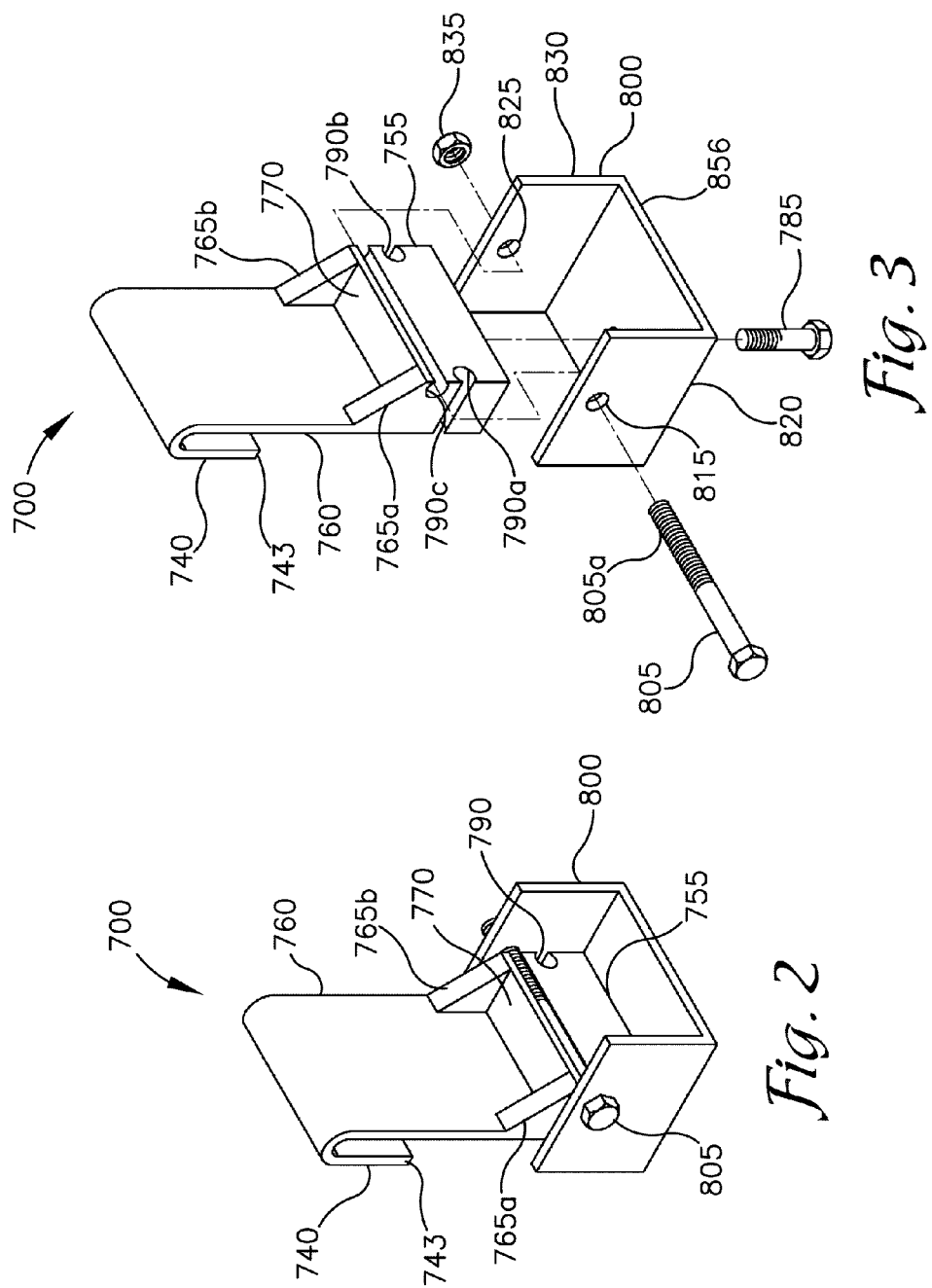

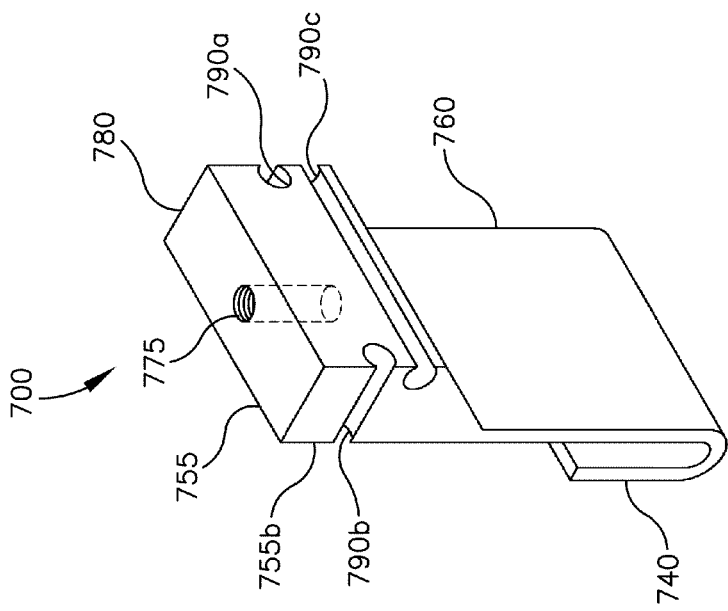
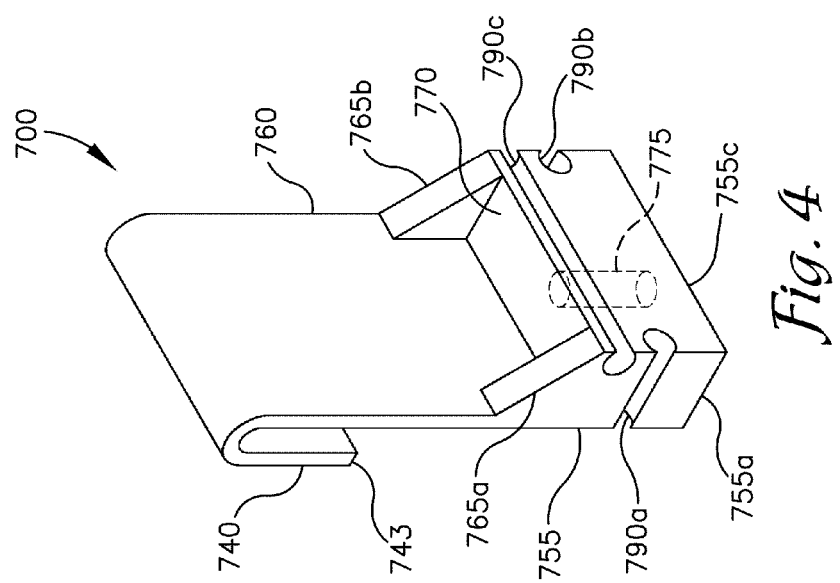

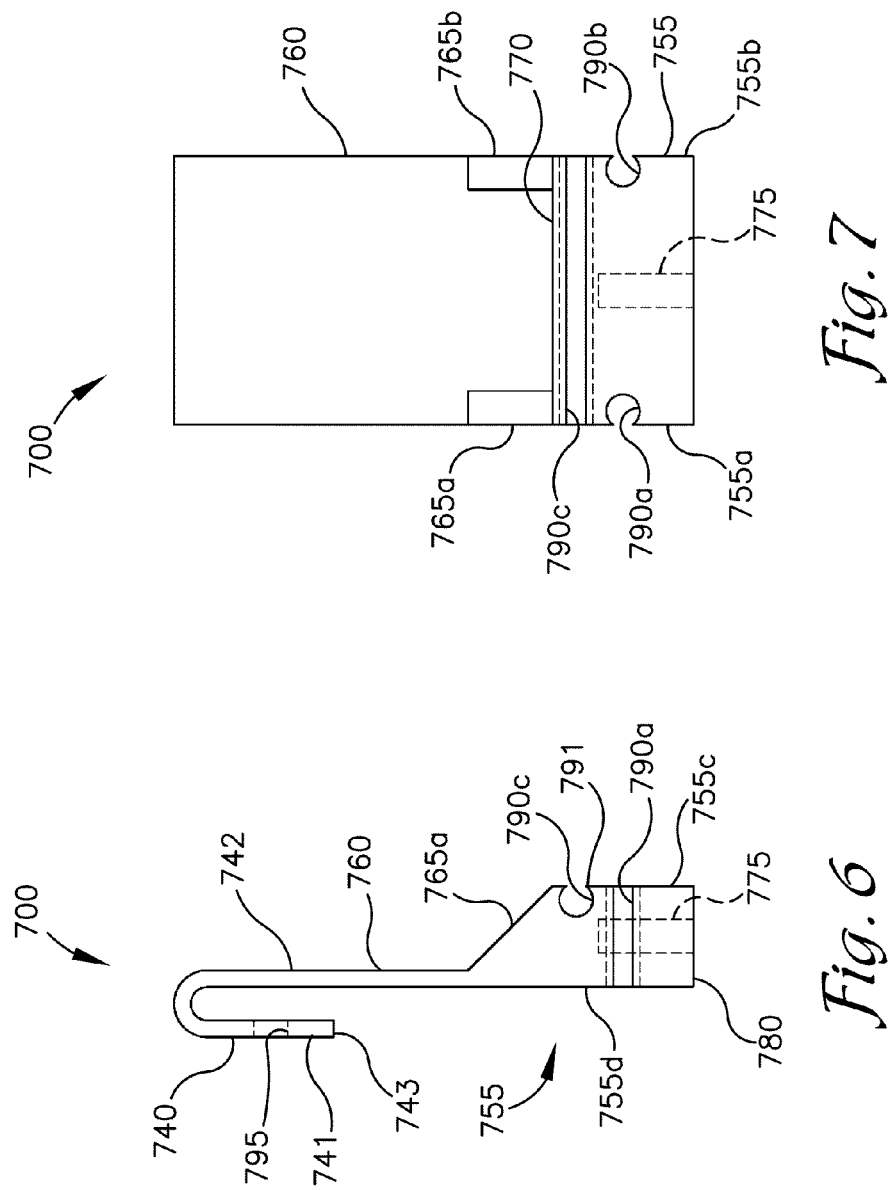

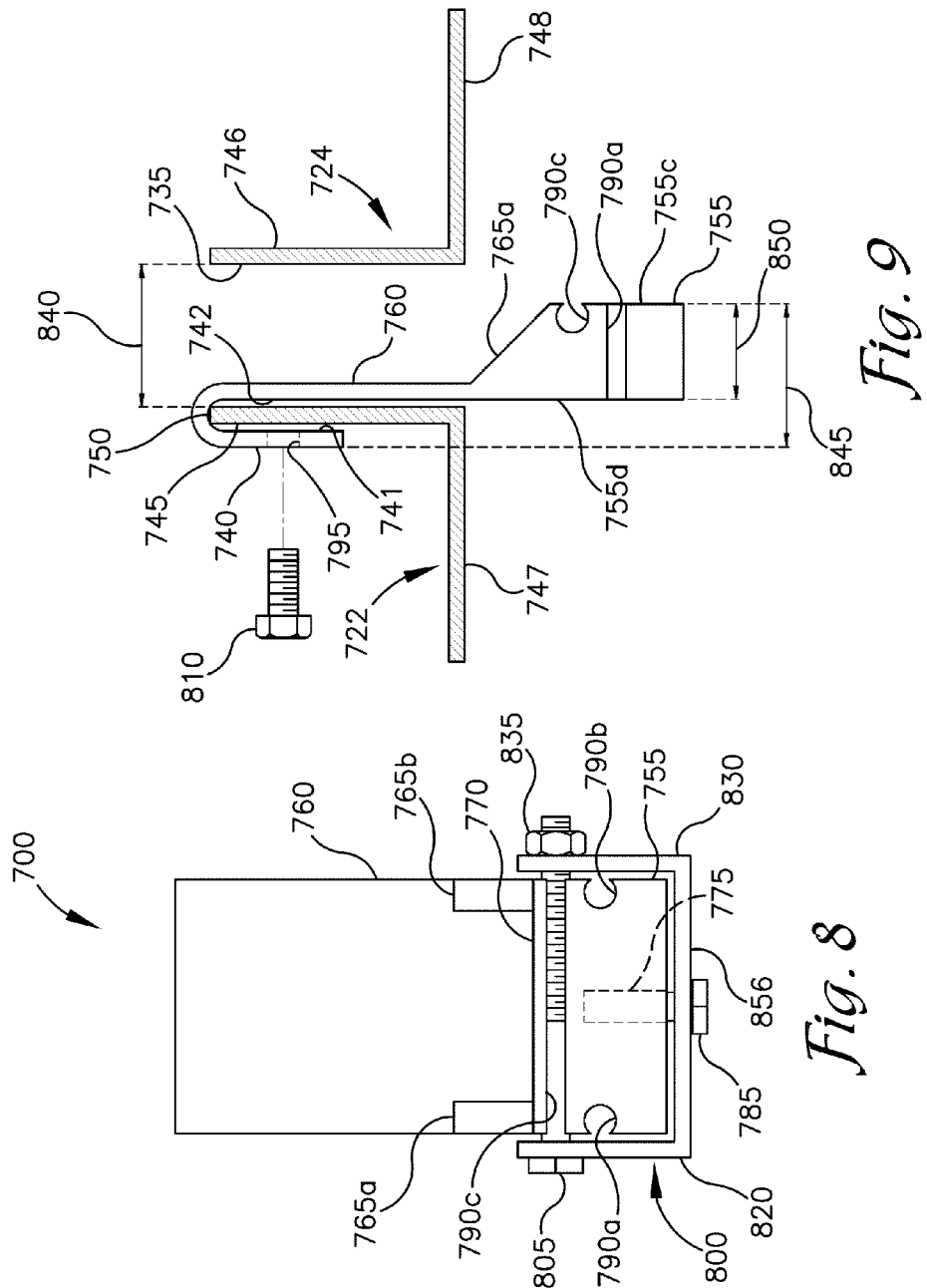

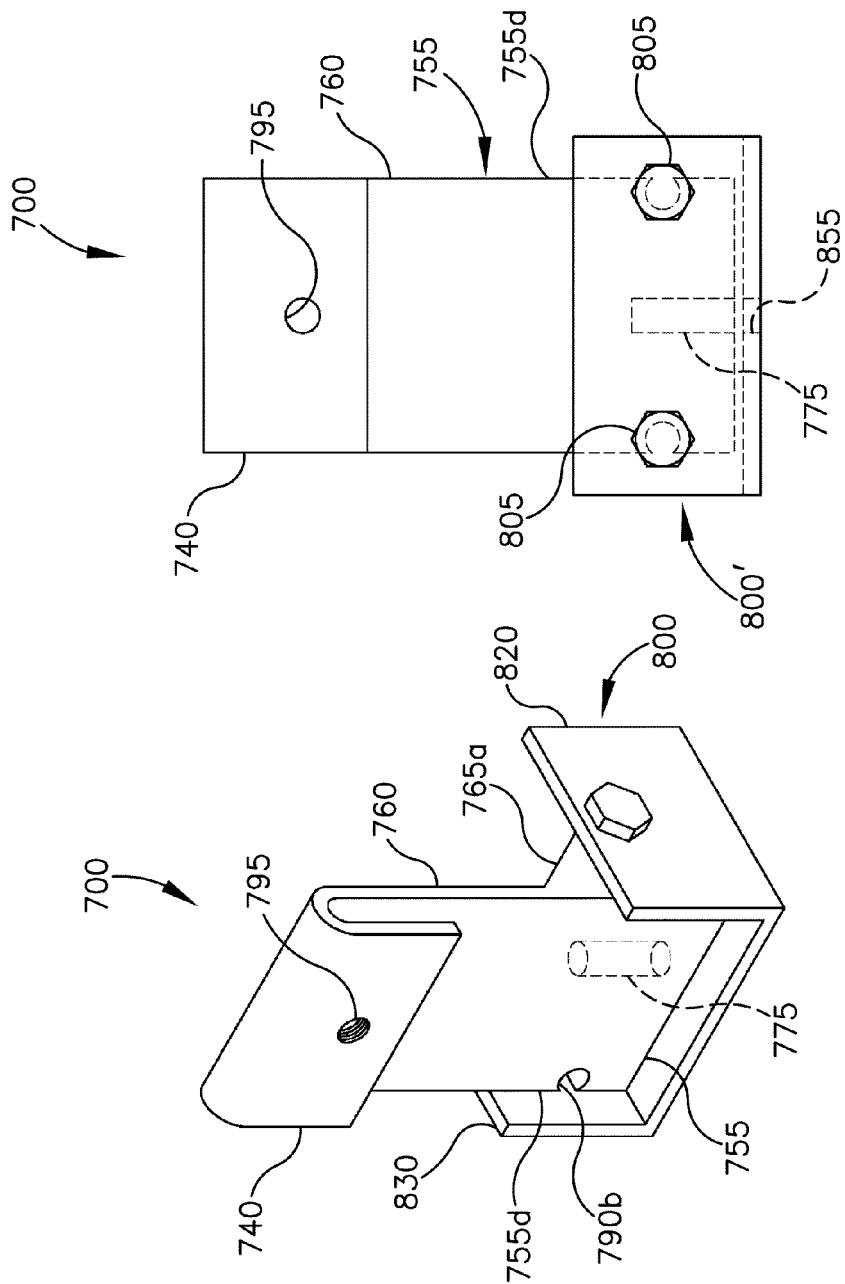

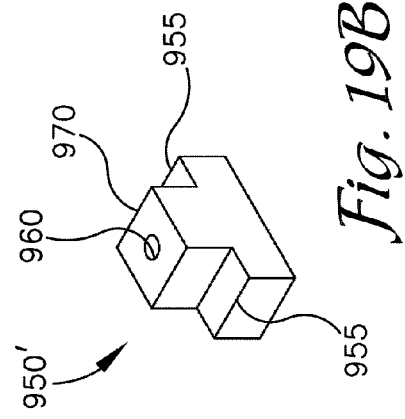
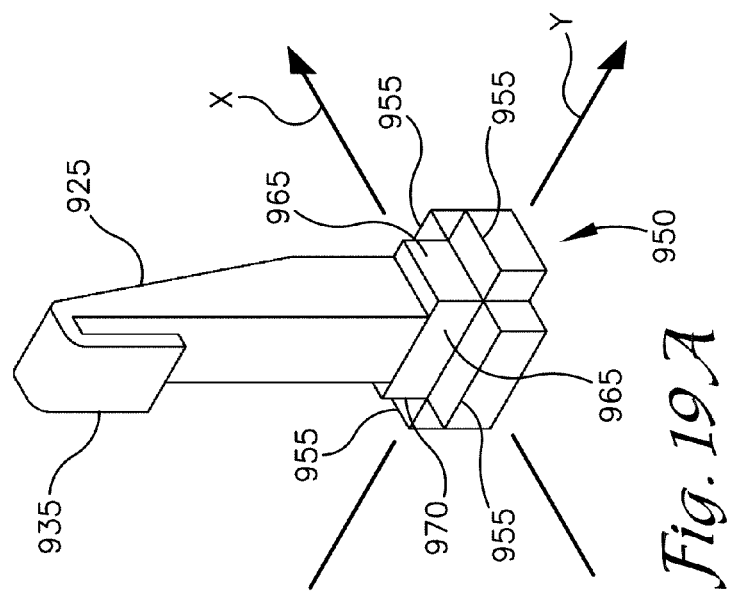
Fig. 19B
Fig. 19A

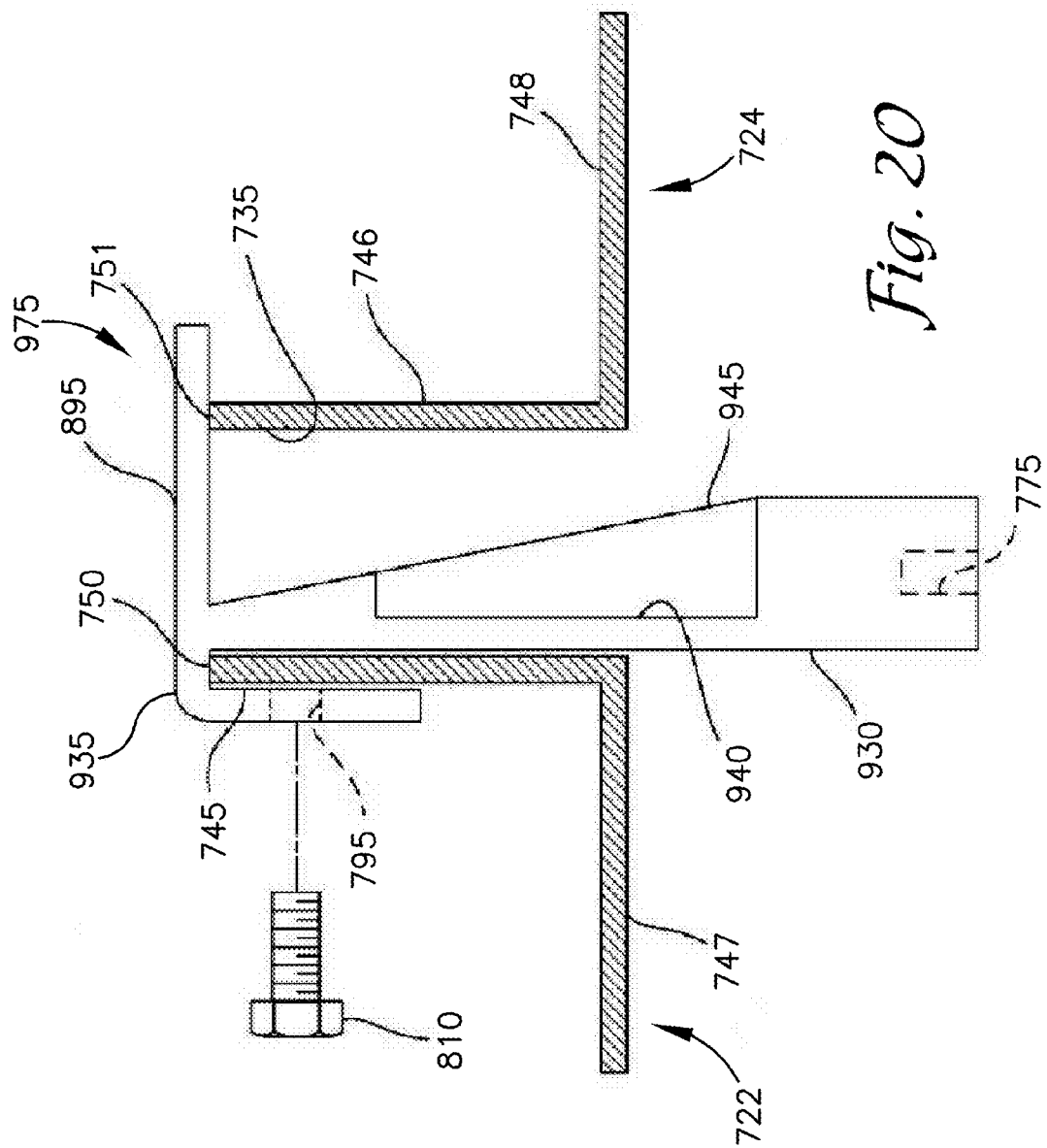

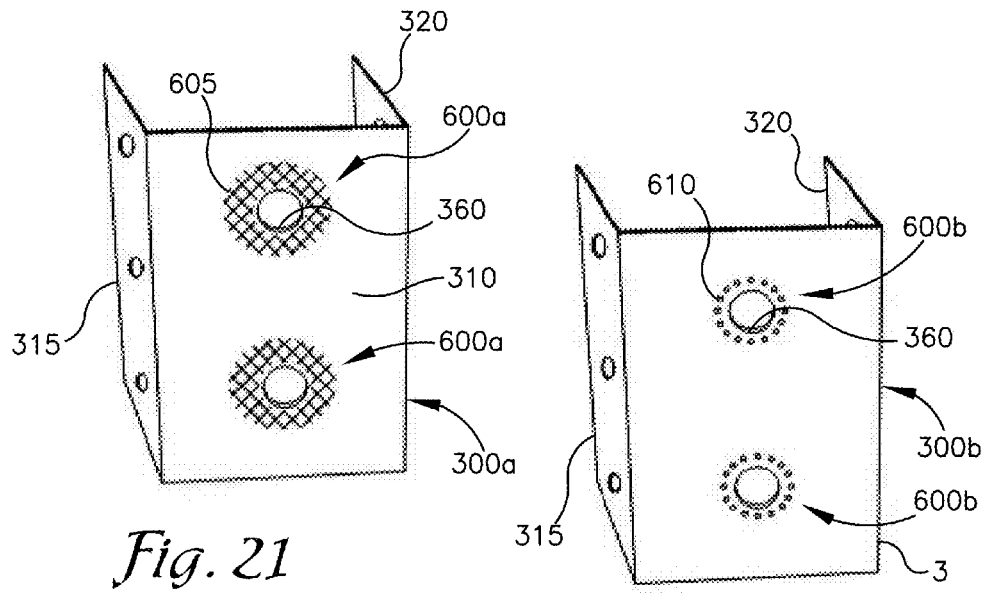
Fig. 21
Fig. 22
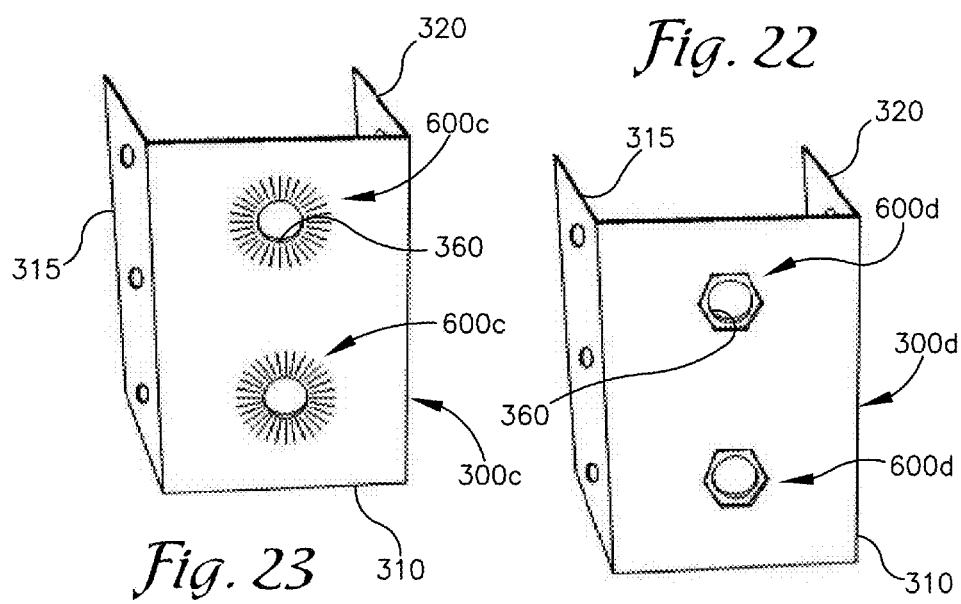
Fig. 23
Fig. 24

TRUSS MOUNTED SUPPORT SYSTEM

CROSS-REFERENCE TO RELATED APPLICATIONS

This application also claims the benefit 35 U.S.C. 120 of the filing date of co-pending provisional application Ser. No. 60/983,851 filed Oct. 30, 2007.

BACKGROUND OF THE INVENTION

1. Field of the Invention

The present invention relates generally to hanger supports for hanging pipes, cables or other materials from support structures such as trusses. More particularly, the present invention relates to a hanger support that is adjustable so that a device or item hung from the hanger support may be placed in any of several radially differentiated positions relative to the support structure.

2. Description of the Related Art

Support structures, such as truss rails, may comprise a first length of angle iron having a first vertical flange projecting vertically upward from a first horizontal flange, and a second length of angle iron having a second vertical flange, oriented parallel to the first vertical flange, and projecting vertically upward from a second horizontal flange. The horizontal flanges of the angle irons project horizontally outward relative to each other so that the vertical flanges may be placed as close to each other as desired. Typically, the vertical flanges are spaced apart to create a channel for receiving truss webbing.

Devices for hanging materials from trusses typically include a clamping device for secure attachment to a truss element, such as a vertical or horizontal flange, and a hanger attached to, and depending from, the clamping device for receiving material to be stored or retained, such as pipe or conduit. Such clamping devices can be cumbersome to install, however, particularly if the hanger must be positioned and secured at the same time the clamping device is attached to the support structure.

SUMMARY OF THE INVENTION

The purpose of this invention is to provide an improved hanger support system that allows materials such as electrical conduit, cable, water or gas pipes, or lumber to be suspended from, or attached to, existing building support elements such as trusses with parallel rails or support members.

One embodiment of the system includes a hanger support having an upwardly projecting hook for attachment to the lower rungs or rails of a truss. The hanger support may include threaded and unthreaded bores for receiving bolts or threaded rod for holding a clevis or other hanger attachment means.

Multiple devices or elements having similar characteristics may be referred to herein collectively by a single number, and individually by the additional designation of a lower case letter appended to such number. Various advantages of the invention will become apparent from the following description taken in connection with the accompanying drawings, wherein is set forth by way of illustration and example various and several embodiments of the present invention.

BRIEF DESCRIPTION OF THE DRAWINGS

FIG. 2 is a front and left perspective view of a clevis attached to a hanger support.

FIG. 3 is an exploded, perspective view of the clevis and hanger support of FIG. 2.

FIG. 4. is a top, front and left perspective view of a hanger support.

FIG. 5 is a bottom, front and right perspective view of the hanger support of FIG. 4.

FIG. 6 is a left side elevation of the hanger support of FIGS. 4 and 5.

FIG. 7 is a front elevation of the hanger support of FIGS. 4 through 6.

FIG. 8 is front elevation of the hanger support of FIGS. 4 through 7 bearing an attached clevis.

FIG. 9 is a left side elevation of the hanger support of FIGS. 4 through 7 hung upon the vertical flange of the leftmost of a pair of angle irons forming the lower portion of a truss, the angle irons shown in cross sectional view.

FIG. 10 is a top, rear and left perspective view of the hanger support and clevis of FIG. 8.

FIG. 11 is a rear elevation of an alternative embodiment of a clevis attached to a hanger support.

FIG. 19A is a top, rear and left perspective view of a hanger support attached to an underlying extension.

FIG. 19B is a top perspective view of a further embodiment of an extension.

FIG. 20 is an elevational view of a further embodiment of a hanger support.

FIG. 21 is a top, left perspective view of a clevis having knurling surrounding the hanger mounting hole for radially fixing engagement between the clevis and a hanger.

FIG. 22 is a top, left perspective view of a clevis having nubs radially distributed around the hanger mounting hole for radially fixing engagement between the clevis and a hanger.

FIG. 23 is a top, left perspective view of a clevis having ridges surrounding the hanger mounting hole for radially fixing engagement between the clevis and a hanger.

FIG. 24 is a top, left perspective view of a clevis with an hexagonal depression in the base for mating with an hexagonal protrusion in an attached hanger.

DETAILED DESCRIPTION

Figure 1:
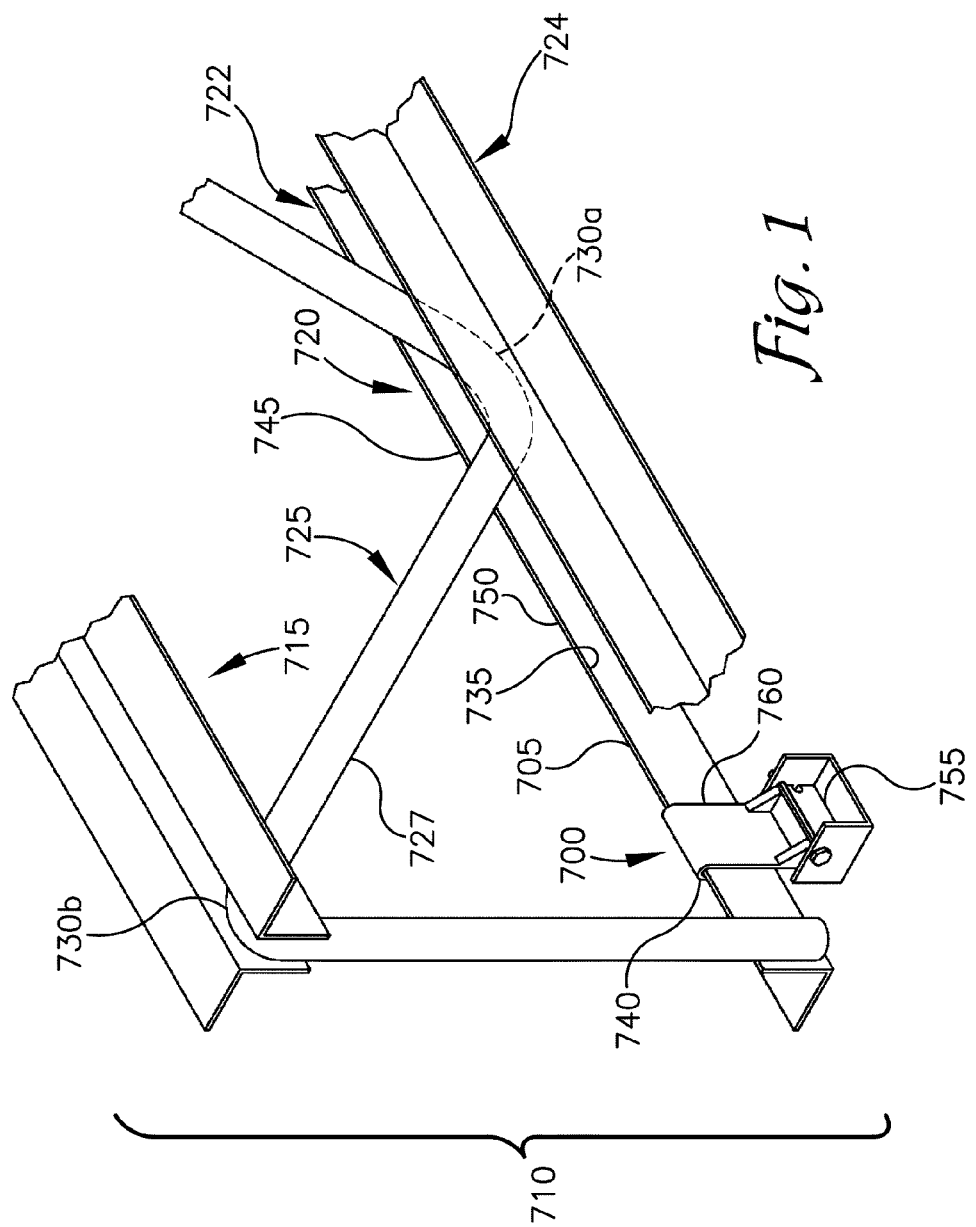
FIG. 1 is a perspective view of a hanger system showing a hanger support mounted upon the lower portion of a truss.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. In the drawings, similar numerical references indicate corresponding parts.

Referring now to the figures, the reference numeral 700 generally designates a hanger support system for supporting and hanging materials such as cables or pipes from a support structure such as a truss. FIG. 1 illustrates an embodiment of a hanger support 700 mounted on a lower portion 705 of a truss 710. The truss 710 is a prior art building component comprising an upper pair 715 and a lower pair 720 of elongated, rigid, longitudinally parallel support structures, such as lengths of angle iron, the upper pair 715 connected to the lower pair 720 by an open web 725 of rigid tubing or rod. Preferably, the web 725 for a given section of truss 710 comprises a continuous length of metal rod 727 running back and forth between the upper 715 and lower pairs 720 of angle irons for the length of the truss. Typically, the rod 727 is welded in place as it passes between a pair of angle irons and forms a bend 730. Therefore, at each lower bend 730a of the rod 727, the rod 727 is welded between the lower pair 720 of angle irons (e.g. 722 and 724), and at each upper bend 730b in the rod 727, the rod 727 is welded between the upper pair 715 of angle irons. This conformation creates a gap or channel 735 between lengths of angle iron forming the upper pair 715 or lower pair 720. The width of the gap 735 is typically determined by the width or diameter of the rod 727 held between the lengths of angle iron.

Referring to FIGS. 1-11, the hanger support 700 makes use of the gap 735 by providing a hook 740 that passes upward between the lower pair 720 of angle irons 722 and 724 and through the gap 735 therebetween. The curved hook 740 may then be positioned to extend over the upwardly projecting, vertical flange 745 of one of the angle irons 722 so that the hook 740 rests upon the upper edge 750 of the vertical flange 745 (see FIG. 9).

Referring more particularly to FIGS. 2-7, which show various views of the hanger support embodiment 700 illustrated in FIG. 31, the hook 740 is attached to, or projects from, a main body portion 755 of the hanger support 700 which comprises a generally cubed-shaped piece of rigid material, such as metal or plastic, including steel, aluminum, PVC, etc. A relatively flat, elongated tongue 760 projects upward from the main body 755 along one side thereof and then curves outward, downward and back on itself to form the aforementioned hook 740. The hook 740 includes shank 742, and bite or outer wall 741 with a tip 743 spaced above an upper surface or portion of the main body 755. A gap 744 is formed between the shank 742 and tip 743 of hook 740 for receiving the vertical flange or strap 745 of the support structures or angle irons 722 and 724. Typically, the main body 755 and tongue 760 are cast as a single piece, but it should be appreciated that the tongue 760 and main body 755 may be formed separately and later attached through any appropriate means such as welding, adhesive, or mechanical fasteners (not shown). In order to more firmly secure the tongue 760 to the main body 755, and prevent the tongue 760 from breaking or bending, gussets 765a and 765b may be provided on the forward face of the tongue 760, where the tongue 760 joins the upper surface 770 of the main body 755.

While the hook 740 forms a means for attaching the hanger support 700 to the vertical flange 745 of an angle iron 722, the main body 755 includes means for attaching hangers, or any other item or device to be suspended from the associated truss 710, to the hanger support 700 itself. For example, the main body 755 typically includes a threaded bore 775 projecting from the bottom surface 780 of the main body 755 upward into the interior of the main body 755. The threaded bore 775 may project through the main body 755 to emerge through the upper surface 770 but typically is closed at the upper end of the bore and terminates within the main body 755. The threaded bore 775 is sized to accept bolts 785 or threaded rod that may be used to attach other items including other hanging or support devices.

Additionally, the hanger support 700 typically includes one or more unthreaded bores 790a-c that are partially exposed along a longitudinal section thereof to form a gap along the length of the bore 790. A bore 790 may be situated across the front and/or side surfaces of the main body 755. An end view of a bore 790, for example 790c in FIG. 6, shows a gap 791 in the wall of the bore 790c. This gap 791 typically has an arcuate length of about 120° or less, preferably has an arcuate length of about 90° or less, but must have an arcuate length of less than 180° in order for the walls of the bore 790 to retain a partially enclosed shank of a bolt (not shown) or other rod-shaped structure passed through the bore 790. FIGS. 3-7 illustrate a hanger support 700 with exposed bores 790 formed along the left side 755a, right side 755b and across the front side 755c of the hanger support main body 755.

The front 790c and side bores 790a and 790b are partially exposed to minimize their incursion in to the main body 755 in order to leave enough of the main body 755 intact to accommodate the threaded bore 775 described above, and to allow sufficient material thickness between the various bores to maintain the structural strength and integrity of the main body 755. As should be appreciated, a bore 790 with a longitudinally exposed section of about 120° or less, or preferably about 90° or less, presents sufficient remaining wall curvature to retain an enclosed cylindrical object of similar diameter to the bore.

As shown in FIGS. 2, 3, 8, 10 and 11, and FIGS. 21 through 24, a clevis 800, may be attached to the hanger support 700 by passing a bolt 805 of appropriate dimensions from left to right, first through a hole 815 in a left arm 820 of the clevis 800, then through the bore 790c that traverses the front side 755c of the hanger support main body 755, and then through a hole 825 in a right arm 830 of the clevis 800 to threadably engage a nut 835. Alternatively, the hole 825 in the right arm of the clevis may be tapped to threadably engage the threaded end 805a of the bolt 805, thereby eliminating the need for a nut 835.

As illustrated in FIG. 9, the hook 740 is sized to rest upon the upper edge 750 of a vertical flange 745 of an angle iron 722. A set screw 810 is threaded through a tapped set screw hole 795, formed in the outer wall or bite 741 of the hook 740, to engage the outer surface of the flange 745. By tightening the screw 810 against the flange 745, the flange 745 is tightly pressed in frictional engagement with the inner wall or shank 742 of the hook 740. The flange 745 is thereby pinched and held between the screw 810 and the inner wall 742 of the hook 740 and the hanger support 700 is locked into operating position (shown in FIG. 9) upon the truss 710.

FIG. 9 also generally illustrates operative relative dimensions of the hanger support 700 to the angle iron pieces 722 and 724. Angle irons 722 and 724 are arranged parallel to one another so that vertical flanges 745 and 746 face each other and project upward from respective horizontal flanges 747 and 748, which project horizontally outward from each other. Angle irons 722 and 724 are separated from one another by a gap 735 that typically corresponds to the diameter of the rod 725 (not shown in this view) forming the truss webbing (see FIG. 1). Arrow 840 indicates the width of the gap 735. Preferably, the front-to-back (left-to-right as shown in FIG. 9) outer dimension 845 of the hanger support 700, from the outer (leftward) surface of the hook 740 to the outer (rightward) surface of the main body 755 (see arrow 845), is at least marginally less than the gap width 840. This preferred dimension 845 will allow the hanger support 700 to be passed upward, through the gap 735, until the hook 740 may be passed over the upper edge 750 of the vertical flange 745 and then lowered downward so that the underside of the hook 740 rests upon the upper edge 750.

If, conversely, the gap width 840 is less than the width 845 of the hanger support 700, the hanger support 700 may still be installed upon the truss 710 by lowering the hanger support 700 onto the vertical flange 745 from above the angle irons 722 and 724 so that the main body 755 passes through the gap 735 and the hook 740 rests upon the upper edge 750. It should be appreciated that the gap width 840 must still exceed the width of the main body 755 (see arrow 850) to allow passage of the main body 755 through the gap 735.

It is to be understood, that by resting the hook 740 on an upper edge of either vertical flange 745 or 746, greater vertical support is provided than by supporting a hanger or hanger support off of the horizontal flanges 747 or 748 of either angle iron 722 or 724 respectively. This is due in part to the relative dimensions of the legs, with the vertical flanges 745 and 746 being substantially taller than they are wide and therefore more rigid vertically than the horizontal flanges 747 and 748 which are relatively short and prone to bending under a significant downwardly directed load.

FIG. 10 provides a rear, perspective view of the hanger support and clevis of FIGS. 2, 3 and 8, further showing a tapped hole 795 in the outer wall of the hook 740 for receiving the set screw 810.

Utilizing the side bores 790a and 790b in a hanger support main body 755, a clevis 800' with two holes (not shown) in each arm may be oriented so that the arms of the clevis 800' face the front side 755c and back side 755d of the hanger support main body 755, as shown in FIG. 11. In this example, bolts 805 are passed through pairs of holes in one arm of the clevis 800' and then through bores 790a and 790b formed in the left and right sides of the main body 755 to emerge through opposing holes in the other arm of the clevis 800'. The bolts 805 may then engage nuts 835 (not shown in FIG. 11) to firmly secure the clevis 800' to the hanger support 700. Typically, and as shown in broken lines in FIG. 11, a hole 855 is formed in the bottom or base 856 of the clevis 800' to align with the threaded bore 775 in the bottom of the hanger support 700.

Figure 12:
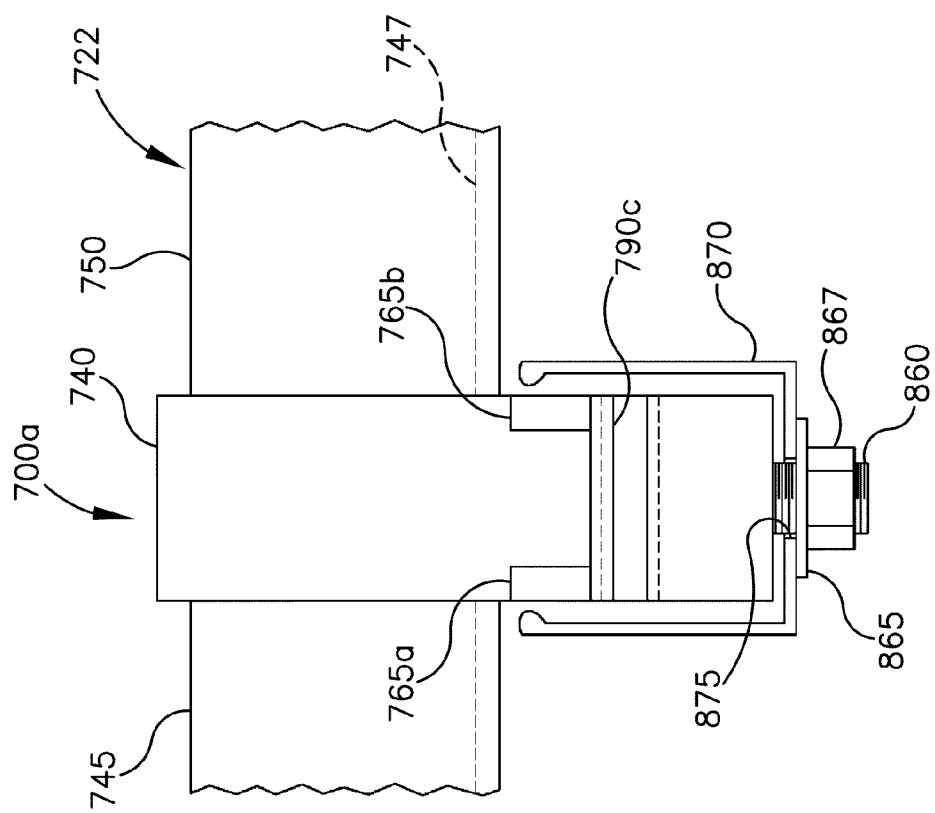
FIG. 12 is a front elevation of an alternative embodiment of a hanger support hung upon the vertical wall of an angle iron and supporting a strut bar.

FIG. 12 illustrates an alternative embodiment of a hanger support 700A hung upon the vertical flange 745 of an angle iron 722. A threaded stud 860 projects from the bottom of the hanger support 700A. The threaded stud 860 may be soldered, welded or otherwise attached to the hanger support 700A during manufacturing thereof, or may be installed at a later time prior to use.

A common strut bar 870 is shown attached to the hanger support 700A by passing the stud 860 through one of several holes 875 typically present in the bottom surface of the strut bar 870, placing a lock washer 865 onto the stud 860, and then threading a nut 867 onto the stud 860 to hold the strut bar 870 in place. The strut bar 870 is typically attached to at least a second hanger support 700A in a similar fashion. The strut bar 870 may then serve as an attachment surface for hangers all along its length.

Figure 13:
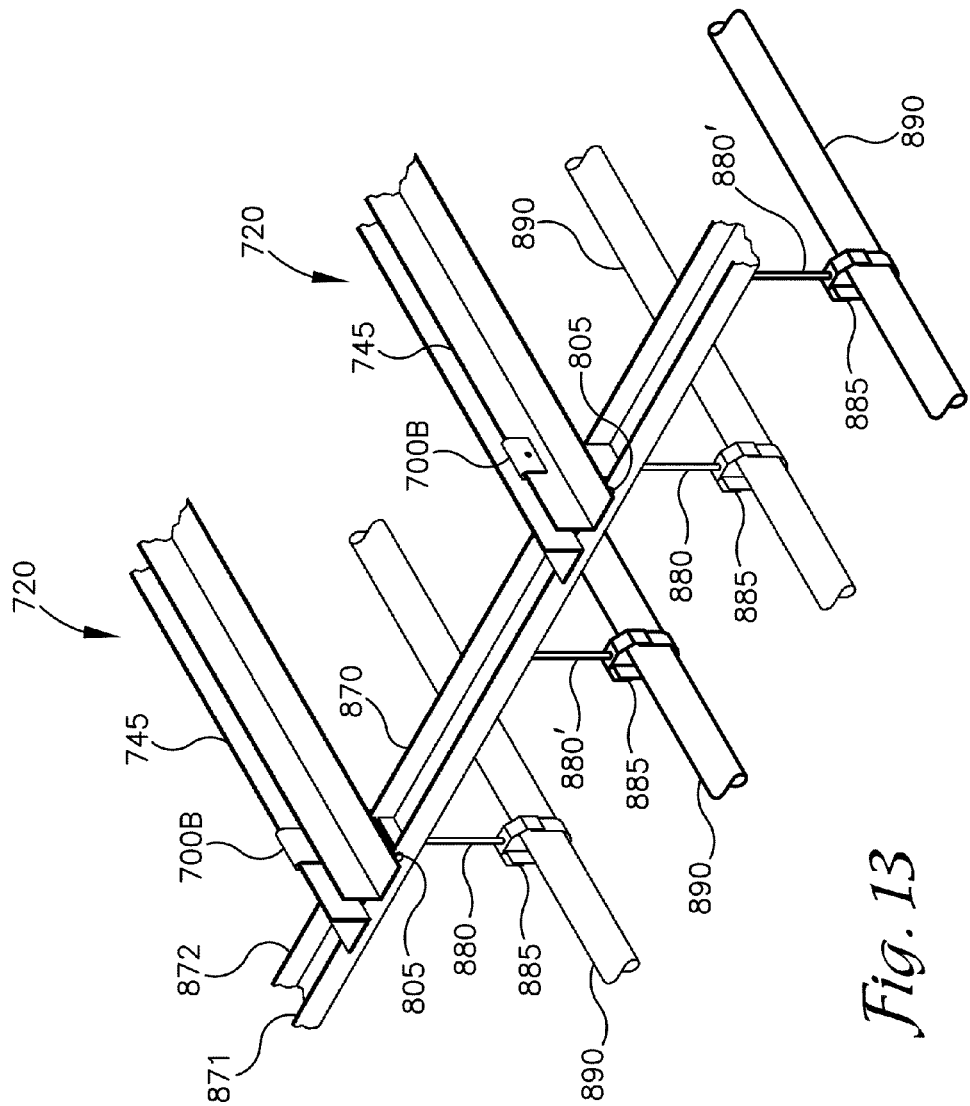
FIG. 13 is a perspective view of an alternative embodiment of a hanger system showing conduit mounted on hangers disposed at varying intervals along a strut bar hung via hanger supports at a perpendicular orientation to the longitudinal axes parallel supporting trusses (the upper pairs of angle irons and webbing omitted for clarity).

FIG. 13 illustrates a strut bar 870 mounted across two pairs 720 of angle irons using two hanger supports 700B. Each hanger support 700B is hung upon one angle iron of each pair 720. The hanger supports 700B are each provided with a threaded bore (similar to the threaded bore 775 shown in illustrations of hanger support 700) projecting upward and inward from the bottom surface of the main body 755, instead of a stud 860. The threaded bore 775 of each hanger support is aligned over a hole 875 in the strut bar 870. Threaded rod 880 is passed through a hole 875 to threadably engage the aligned threaded bore 775. A hanger 885 may be attached to the end of the threaded rod 880 distal the hanger support 700B. Conduit 890 or other material may thereby be retained by the hanger 885 for suspension from the strut bar 870.

The strut bar 870 is attached to the hanger supports 700B via bolts 805 passed through holes (not shown) in the strut bar arms 871 and 872 and through the horizontal bores 790c in the hanger support main bodies 755. This means for attachment is similar to that shown in FIG. 18 for attachment of a clevis 800 to a hanger support 700.

It should be appreciated that additional threaded rod 880' and associated hangers 885 may also be suspended from the strut bar 870 by passing the upper end of each threaded rod 880' upward through a hole 875 to engage a washer and threaded nut (not shown), thereby hanging the threaded rod 880' upon the strut bar 870.

In a further embodiment of the hanger system 1, a radially adjustable connector 600 (e.g. 600a, 600b, 600c and 600d, see FIGS. 21-24) is provided that allows hangers or other devices attached to a hanger support 700 to be rotated in any selected radial orientation in the plane of an associated clevis base 310. The radial connector 600 typically comprises two mating surfaces, one associated with the lower or outer surface of a clevis 300, such as the clevis base 310, the other associated with the hanger or associated intermediate structure (see FIGS. 25 and 26). FIGS. 21-24 illustrate four devises 300a, 300b, 300c and 300d, each bearing means for radially fixing engagement between the clevis 300 and an attached device such as a hanger 620. FIG. 21 shows a clevis 300a wherein the outer surface of the clevis base 310 proximate the tapped clevis bore 360 bears knurling 605. Knurling 605 may be stamped, cut or etched into the clevis either randomly or in a pattern.

Figure 25:
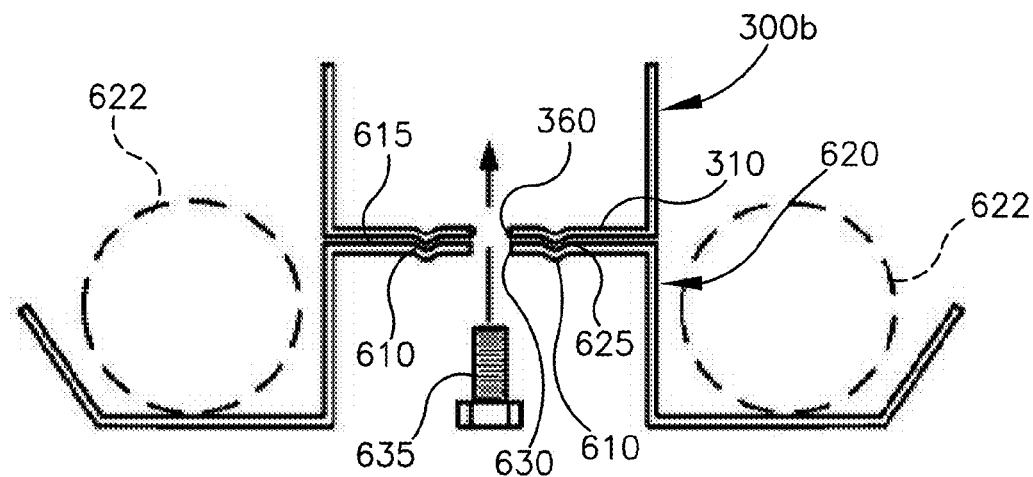
FIG. 25 is a cross-sectional diagram showing the interconnection between a clevis and a hanger via radial connector.
Figure 26:
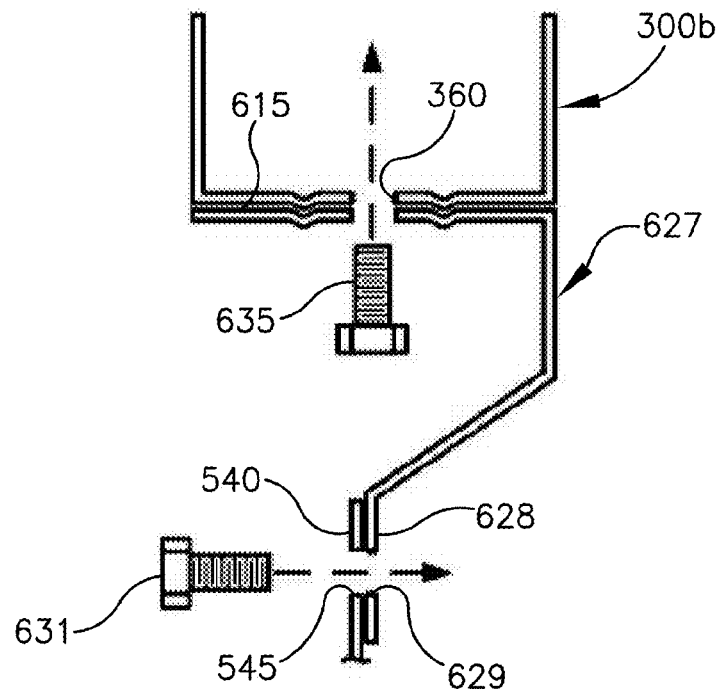
FIG. 26 is a cross-sectional diagram showing the interconnection between a clevis and a hanger via radial connector.

Knurling is also provided on the opposing surface of a hanger 620 and a bolt 635 is threaded through the hanger 620 and clevis 300a so that the opposing knurled surfaces are drawn together, see FIGS. 25 and 26. When the bolt 635 is loosened, the hanger 620 may be turned about the bolt 635 in any selected radial orientation to the clevis 300a. When the bolt 635 is tightened, the friction between the adjoining knurled surfaces of the hanger 620 and the clevis 300a prevent the hanger from turning and the hanger is thereby locked into the selected radial orientation.

FIG. 22 shows a clevis 300b bearing a series of small projections or nubs 610 encircling the tapped hole 360 in the clevis 300b. The mating surface 615 of a hanger 620 is provided with dimples 625 in matching radial conformation to the nubs 610 so that when the tapped hole 360 in the clevis is in axial alignment with an opposing hole 630 in the hanger 620, the nubs 610 fit into the dimples 625. FIGS. 25 and 26 provide cross-sectional diagrams of this arrangement. As shown by way of example, a hanger 620 bearing two pipes or pieces of conduit 622 (shown in broken lines) is positioned below a clevis 300b so that the holes or apertures 360 and 630 are in axial alignment. A bolt 635 is then passed through the hanger aperture 630, which is typically not threaded, to engage the threaded (tapped) aperture 360 in the clevis base

310. As the bolt 635 is tightened, the nubs 610 projecting downward from the base 310 of the clevis fit into the dimples 625 in the upper surface of the hanger 620 surrounding the hanger aperture 630. The hanger 620 is thereby locked into position relative to the clevis 300*b*. Conversely, by loosening the bolt 635, the hanger 620 may be pulled slightly away from the clevis 300*b*, disengaging the nubs 610 and dimples 625, so that hanger 620 may be turned about the longitudinal axis of the bolt 635 to another selected radial orientation relative to the clevis 300*b*. The radial connector 600*b* provided by the matching projections and dimples of the clevis and hanger preferably provides angular adjustment in arcuate segments of 22° or less.

FIG. 26 illustrates a similar connection (via radial connector 600*b*) between a clevis 300*b* and an intermediate hanger 627. Intermediate hanger 627 includes a lower flange 628 bearing tapped hole 629 for providing a means for attaching a hanger such as hanger 500. A bolt 631 is passed through mounting aperture 545 in tab 540 to engage threads in hole 629. In this manner, hanger 500 may be turned about the radius of radial connector 600*b* to a desired orientation and then locked into that orientation by tightening bolt 635.

FIGS. 23 and 24 show two other alternative embodiments of a radial connector including stamped, molded or machined ridges 600*c* arrayed in radial conformation about the hanger aperture 360 in a clevis base 310 (FIG. 23), and a hexagonal depression 600*d* surrounding and including the hanger aperture 360 (FIG. 24) sized to accept a matching hexagonal projection in the upper surface of an attached hanger.

Figure 14:
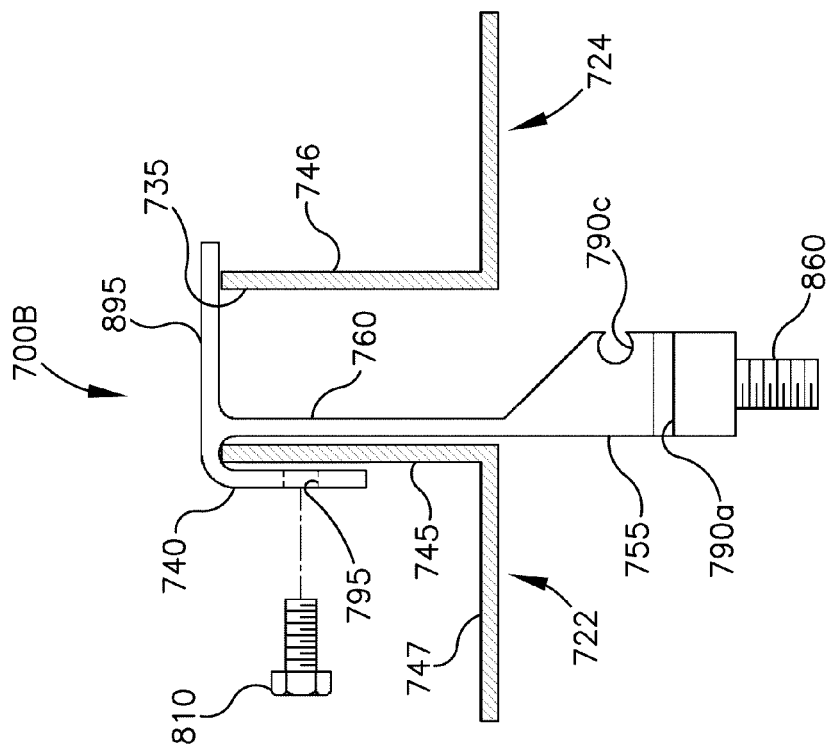
FIG. 14 is a left side elevation of an embodiment of a hanger support including a forwardly projecting horizontal flange.

FIG. 14 illustrates yet another embodiment of a hanger support 700B. This hanger support 700B is structurally and functionally similar to the previously described embodiments 700 and 700A, with the addition of a horizontal flange 895 projecting forwardly from the upper portion of the tongue 760 to span the gap 735 between the angle iron 722 engaged with the hook 740 and the adjacent, parallel angle iron 724, to rest upon the vertical flange 746 thereof. This embodiment of a hanger support 700B provides the advantages of distributing weight born by the hanger support 700B across both angle irons 722 and 724, as well retaining the main body 755 of the hanger support in a vertical position during attachment of a strut bar 870 and other assembly, whereas the hanger support 700 or 700A may tend to tilt somewhat from a vertical position if the hook 740 rocks upon the underlying vertical flange 745.

Figure 15:
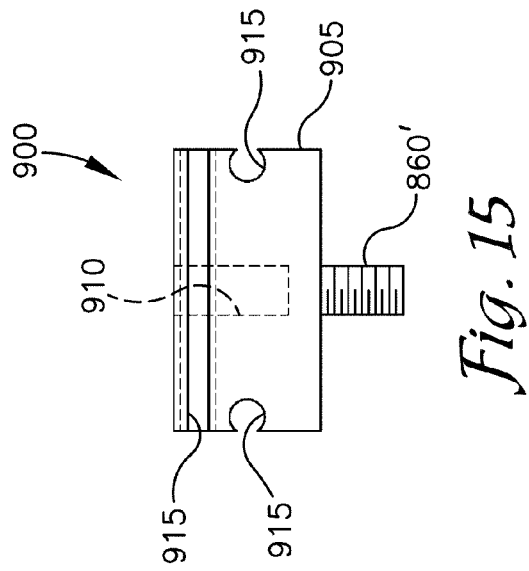
FIG. 15 is a front elevation of an extension for a hanger support.

FIG. 15 illustrates an extension 900 of a hanger support for extending the vertical length of the main body 755. The extension 900 includes a body portion 905, typically of similar proportions to the main body 755, a threaded bore 910 for threaded engagement with the stud 860 projecting from the main body 755, and an extension stud 860' for providing engagement with strut bars 870 or other elements to be attached to the lower portion of the extension 900. The body portion 905 may include bores 915 similar to those provided within the main body 755, i.e. 790*a*, 790*b*, and 790*c*.

Figure 17:
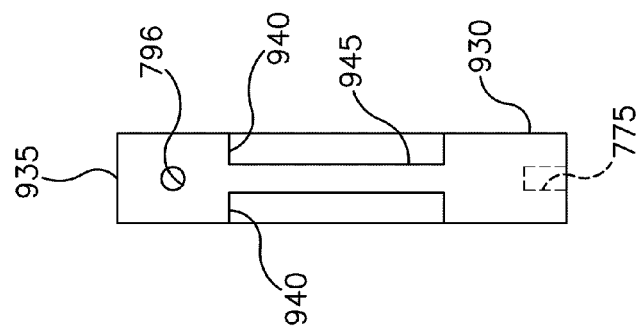
FIG. 17 is a front elevation of the hanger support of FIG. 16.
Figure 16:
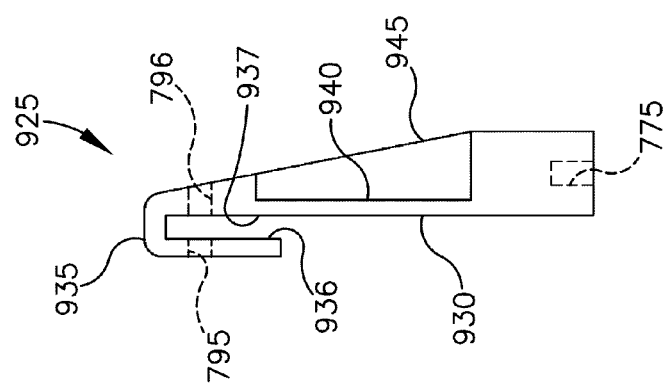
FIG. 16 is a left side elevation of another embodiment of a hanger support.

FIGS. 16 and 17 illustrate an embodiment of a hanger support 925 including a main body 930 and a hook 935 projecting upward therefrom. The hanger support 925 may include two areas of relief, or notches 940, defining, and disposed laterally on either side of, a forward, vertical spine 945. The principle function of the notches 940 is to reduce the amount of material used to compose, and concomitant weight of, the hanger support 925, while leaving the spine 945 remaining to maintain the rigidity and structural strength of the main body 930.

A tapped, set screw hole 795 is formed in the outer wall 936 of the hook 935 to receive a set screw 810 (see FIGS. 14 and 20) for threaded engagement with the hole 795. The set screw 810 is threaded through the hole 795 to engage the outer surface of an angle iron flange 745. By tightening the screw 810 against the flange 745, the flange 745 is pinched between the screw 810 and the inner wall 937 of the hook 935, thereby locking the hanger support 700 into operating position (shown in FIG. 9) upon a truss 710. An alternate, tapped, set screw hole 796 may be formed in the inner wall 937 to receive a set screw 819 from the front of the hanger support 925.

Figure 18:
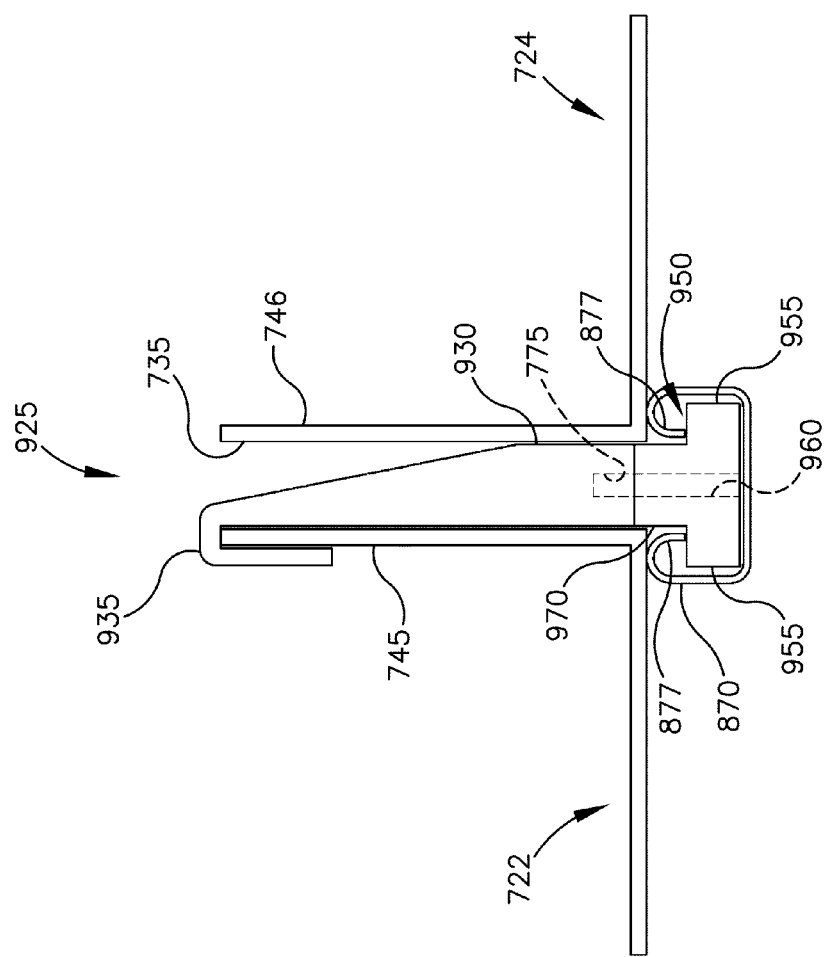
FIG. 18 is a cross sectional diagram of a hanger support, and attached further embodiment of an extension, hung upon the vertical flange of an angle iron and supporting a strut bar.

FIG. 18 is a cross sectional diagram of a hanger support 925 (not including notches) hung upon the vertical flange 745 of an angle iron 722 and further including an extension 950 having one or more lips or flanges 955 projecting horizontally outward from a lower portion thereof. The extension 950 is attached below the hanger support 925 via any operable means, such as a bolt passed through aligned bores 960 and 775 in the extension 950 and hanger support 925 respectively. As illustrated in FIG. 18, the flanges 955 project outward to retain a strut bar 870 by providing underlying support to inwardly and downwardly curving strut bar wall elements 877.

FIG. 19A is a perspective view of a hanger support 925 attached to an underlying extension 950. The extension 950 includes four lips or flanges 955, each projecting from one side wall 965 (the rear side wall and left side wall are shown in FIG. 19A) of a generally rectangular main extension body 970. This extension embodiment allows attachment of a strut bar 870 along either the X or Y horizontal axis of the extension 950.

Extension 950' shown in FIG. 19B includes two lips or flanges 955 projecting horizontally outward from the main extension body 970 in opposing directions. The extension 950' may be attached to the hanger support 925 so that the flanges 955 align with either the X or Y axis. In one embodiment, the bore 960, shown in FIGS. 18 and 19B, is unthreaded to allow unimpeded passage of a bolt shank. The overlying bore 775 in the hanger support 925 is aligned with the bore 960 and is threaded to receive and threadably engage the threads of the bolt as it is tightened to securely attach the extension 950 or 950' to the hanger support 925.

In another embodiment, the hanger support 925 includes a threaded stud 860 projecting downward from the lower surface of the main body 930 (as shown in previously referenced illustrations, e.g. FIGS. 12 and 14) and the bore 960 is threaded to threadably engage the stud 860.

FIG. 20 is an elevational view of a hanger support 975 of similar structure and function to the hanger support 925 illustrated in FIG. 16. In addition to the structure of hanger support 925, hanger support 975 further includes a horizontal flange 895 projecting forward from the top portion of the hanger support 975 to bridge the gap 735 between paired angle irons 722 and 724 and rest upon the upper end 751 of angle iron 724. Therefore, the hook 935 rests upon the first angle iron 722, of a pair of angle irons in longitudinal, parallel alignment, and the flange 895 rests upon the second angle iron 724 of the pair.

It is to be understood that while certain forms of this invention have been illustrated and described, it is not limited thereto except insofar as such limitations are included in the following claims and allowable equivalents thereof. For example, it is also foreseen that the main body of each hanger support could be longer than shown with a plurality of holes extending up through the bottom. Such an embodiment would facilitate connecting more than one support rod below the main body.

Having thus described the invention, what is claimed as new and desired to be secured by Letters Patent is as follows:

1. A truss mounted hanger system for use in association with a truss including a first elongated support structure and a second elongated support structure, the first and second elongated support structures each comprising a vertical strap that is taller than it is wide disposed substantially longitudinally parallel to one another with a gap formed therebetween; said hanger system comprising:
- a hanger support including a main body, said main body including attaching means for attaching items to said main body;
- a hook having a shank projecting upward from said main body and a bite extending in spaced relation from said shank to form a gap therebetween with a tip of said bite extending in spaced relation above said main body, said gap being sized to receive the vertical strap of one of the first and second elongated support structures of the truss with said hook supported on, and said main body hanging from, the selected vertical strap; and
- said hook and said main body sized to permit said hook and said main body, or only said main body, to be inserted between the vertical straps of the first and second elongated support structures to position said hook over and support said hook on the selected vertical strap with said shank of said hook extending between the vertical straps of the first and second support structures and said main body supported at least partially below the first and second support structures.

2. The truss mounted hanger system of claim 1 wherein said attaching means comprises a bore formed in said main body for receiving a threaded connector for attaching a support member to said main body.

3. The truss mounted hanger system of claim 1 wherein said attaching means comprises a threaded bore formed in said main body and projecting into said main body from a bottom surface thereof; said threaded bore sized to receive a threaded connector bolts or threaded rod for attaching a support member to said main body.

4. The truss mounted hanger system of claim 1 wherein said attaching means comprises a transverse bore extending through said main body and transverse to a central axis of said main body.

5. The truss mounted hanger system of claim 1 further comprising a threaded set screw hole formed in said hook, and a threaded set screw sized to threadably engage said set screw hole, whereby said set screw may be threaded through said set screw hole to frictionally engage the vertical strap received within said gap of said hook.

6. The truss mounted hanger system of claim 1 further comprising a clevis mounted to said main body, said clevis including a base and bore in said base.

7. The truss mounted hanger system as in claim 1 in combination with the truss.

8. The truss mounted hanger as in claim 1 wherein said shank extends upward from said main body along a side thereof and said bite is spaced from said shank on a side opposite said main body.

9. A truss mounted hanger system for use in association with a truss including a first elongated support structure and a second elongated support structure, the first and second elongated support structures disposed substantially longitudinally parallel to one another with a gap formed therebetween; said hanger system comprising:
- a hanger support including a main body, said main body including means for attaching items to said main body;
- a hook projecting upward from said main body, said hook sized to hang upon the first support structure;
- said hook and said main body sized to permit said hook and said main body to be inserted between said first and second elongated support structures to hang said hook from the first support structure with said main body supported at least partially below the first and second support structures;
- wherein said attaching means comprises a transverse bore extending through said main body and transverse to a central axis of said main body; and
- wherein said transverse bore is partially exposed along a longitudinal section thereof to form a gap along a length of said bore.

10. The truss mounted hanger system of claim 9 wherein said gap has an arcuate length of approximately 120° or less.

11. The truss mounted hanger system of claim 9 wherein said gap has an arcuate length of approximately 90° or less.

12. A truss mounted hanger for use in association with a truss including a pair of elongated straps secured together in longitudinally parallel and spaced relation to form a gap therebetween; each of said elongated straps being taller than it is wide; said hanger comprising:
- a hanger support including a main body including means for connecting other structure to said main body;
- a hook having a shank projecting upward from said main body and a bite extending in spaced relation from said shank to form a gap therebetween with a tip of said bite extending in spaced relation above said main body, said gap being sized to receive one of the elongated straps of the truss with said hook supported on, and said main body hanging from, the selected elongated strap, said hook sized to be positioned over and supported upon the selected elongated strap with said shank extending through the gap formed between said elongated straps; said shank sized to space at least a portion of said main body below the elongated straps when said hook is supported on the selected elongated strap.

13. The truss mounted hanger as in claim 12 wherein said elongated straps comprise vertical legs of first and second angle irons each having a horizontal leg projecting outward from the vertical leg.

14. The truss mounted hanger as in claim 12 further comprising a support member projecting generally horizontally from an upper end of said hook member and sized to rest on an upper end of a second of said elongated straps.

15. The truss mounted hanger as in claim 12 in combination with the truss.

16. The truss mounted hanger as in claim 12 wherein said shank extends upward from said main body along a side thereof and said bite is spaced from said shank on a side opposite said main body.

17. The truss mounted hanger system of claim 12 further comprising a threaded set screw hole formed in said hook, and a threaded set screw sized to threadably engage said set screw hole, whereby said set screw may be threaded through said set screw hole to frictionally engage the elongated strap positioned within the gap of the hook.

* * * * *